Patented Feb. 10, 1931

1,792,042

UNITED STATES PATENT OFFICE

WINFIELD SCOTT, OF NITRO, WEST VIRGINIA, ASSIGNOR TO THE RUBBER SERVICE LABORATORIES CO., OF AKRON, OHIO, A CORPORATION OF OHIO

AGE-RESISTING VULCANIZED RUBBER

No Drawing.  Application filed September 23, 1929. Serial No. 394,746.

The present invention relates to processes for manufacturing vulcanized products and to the products obtained thereby. It is more particularly directed to processes for vulcanizing rubber wherein there is incorporated into a rubber mix of vulcanization characteristics a compound of the type hereinafter disclosed whereby anti-oxidant or age resisting properties are developed in the vulcanized rubber product. The invention will be understood from the following description and examples of a preferred mode of operating the process wherein the invention is fully set forth and described.

It is well known among rubber chemists that rubber compounds cured in the presence of vulcanization accelerators such as aldehyde derivatives of Schiff's bases, deteriorate much less rapidly in storage or in service than do similar rubber products cured in the presence of certain accelerators such, for example, as diphenyl-guanidine. Certain other compounds that otherwise would function favorably as rubber vulcanization accelerators cannot be employed commercially since the presence of such compounds apparently causes or aids in causing a rapid deterioration of the vulcanized rubber products. Such rubber products are said to age badly, that is, in storage or in service the rubber becomes hard and loses a large part of its resiliency, while other characteristics such as tensile strength and the like are very detrimentally affected.

The age resisting characteristics of a vulcanized rubber product can be readily ascertained by subjecting samples of the vulcanized product in a bomb to the action of oxygen under pressure and at an elevated temperature. The aged rubber samples are then examined and tested and the test data compared with the results obtained on testing the unaged rubber samples. The deterioration in properties effected as a result of the oxidation treatment is indicative of the result that would normally be expected of that particular rubber stock during actual service. Such a test is known as the Bierer-Davis aging test and produces an effect on a vulcanized rubber stock comparable with that resulting from several years of natural aging of the rubber, depending upon the conditions of the test.

According to the present invention, a new class of anti-oxidants has been found which, upon incorporating into a rubber stock imparts exceptional age resisting qualities to the vulcanized rubber stock. The compounds herein disclosed as imparting such anti-oxidant characteristics to vulcanized rubber comprise the sulfur derivatives of the reaction product of a ketone and a naphthylamine.

One of the preferred class of anti-oxidants comprising the sulfur derivatives of the reaction product of alpha naphthylamine and acetone was prepared in the following manner:

Substantially equi-molar portions of alpha naphthylamine (143 parts) and acetone (58 parts) were placed in a vessel equipped with a reflux condenser. Approximately two parts of a suitable catalyst or condensing agent for example iodine, were added and the mixture refluxed for a period of time required to produce the desired reaction, for example, approximately three hours. Substantially ten additional parts of acetone were added and the reaction mixture was refluxed for substantially an additional hour. The reaction product was then isolated by distillation under a pressure less than atmospheric pressure. The product thus obtained was a light yellow thick oil.

Substantially 18.3 parts of acetone-alpha naphthile (0.1 mol), prepared as described, and substantially 3.2 parts of sulfur (0.1 of an atomic weight portion) were placed in a reactor and heated to approximately 150° C. and then approximately 0.2 parts of a suitable catalyst or condensing agent, for example iodine, added and the heating continued for an additional period of substantially one and one-half hours at a temperature of substantially 160 to 170° C. The product thus obtained was a hard black resin.

A sample of this material was compounded in the usual manner in a rubber mix of the following composition:

100 parts of pale crepe rubber,
5 parts of zinc oxide,
3.5 parts of sulfur,
0.75 part of diphenyl-guanidine,
2.0 parts of the sulfur derivative of the reaction product of acetone and alpha naphthylamine.

The stock was then vulcanized by heating sheets of the stock in the usual manner for forty-five minutes at the temperature given by forty pounds of steam pressure per square inch (that is, 287° F.). Portions of the stock cured as set forth were then artificially aged by heating the same in an oxygen bomb for eighteen hours at a temperature of 75° C. and under a pressure of 300 pounds of oxygen per square inch. The results obtained upon testing the aged and the unaged vulcanized stocks are as follows:

| Time of cure | Hours aged | Modulus of elasticity in lbs./in.² at elongations of— | | | Tensile at break in lbs./in.² | Ultimate elongation |
|---|---|---|---|---|---|---|
| | | 300% | 500% | 700% | | |
| 45 mins. at 287° F. | 0 | 183 | 561 | 2050 | 2645 | 760 |
| 45 mins. at 287° F. | 18 | 272 | 861 | 2770 | 2770 | 700 |

It is seen from the data set forth that the aged vulcanized rubber stock wherein one of the preferred type of compounds was employed as an anti-oxidant did not deteriorate any during the artificial aging process. In fact, its physical characteristics were somewhat improved.

Other examples of the preferred class of compounds such for example as the sulfur derivatives of the reaction products of acetophenone and alpha naphthylamine, methyl ethyl ketone and alpha-naphthylamine, benzophenone and alpha naphthylamine, acetone and beta naphthylamine, acetophenone and beta-naphthylamine, methyl ethyl ketone and beta naphthylamine, benzophenone and beta naphthylamine and the like are within the scope of the present invention as suitable anti-oxidants for use in a rubber mix of vulcanization characteristics.

Other accelerators than diphenyl-guanidine could, of course, be employed in conjunction with the preferred class of anti-oxidants and would produce a stock possessing somewhat different physical characteristics than those set forth. Diphenyl-guanidine was employed in the examples set forth because it is known to produce a vulcanized rubber stock that has poor aging qualities and consequently does not mask the effect of the anti-oxidant.

The present invention is to be understood as limited solely by the claims attached hereto as part of this specification wherein the invention is claimed as broadly as possible in view of the prior art.

What is claimed is:

1. The process of manufacturing a vulcanized rubber product possessing age resisting characteristics which comprises incorporating with said product prior to vulcanization a sulfur derivative of a reaction product of a ketone and a naphthylamine.

2. The process of manufacturing a vulcanized rubber product possessing age resisting characteristics which comprises incorporating with said product, prior to vulcanization a sulfur derivative of a reaction product of an alkyl ketone and a naphthylamine.

3. The process of manufacturing a vulcanized rubber product possessing age resisting characteristics which comprises incorporating with said product prior to vulcanization of sulfur derivative of a reaction product of an alkyl ketone and alpha naphthylamine.

4. The process of manufacturing a vulcanized rubber product possessing age resisting characteristics which comprises incorporating with said product prior to vulcanization a sulfur derivative of a reaction product of acetone and alpha naphthylamine.

5. The process of manufacturing a vulcanized rubber product possessing age resisting charactertistics which comprises incorporating with said product prior to vulcanization a product formed by reacting substantially 18.3 parts of the reaction product of substantially equimolecular proportions of acetone and alpha-naphthylamine and substantially 3.2 parts of sulfur.

6. The process of manufacturing a vulcanized rubber product possessing age resisting characteristics which comprises incorporating with said product prior to vulcanization a sulfur derivative of a reaction product of a ketone containing a methyl group and alpha-naphthylamine.

7. An age resisting rubber product comprising the vulcanization product of a rubber stock containing prior to the vulcanization of said stock a sulfur derivative of a reaction product of a ketone and a naphthylamine.

8. An age resisting rubber product comprising the vulcanization product of a rubber stock containing prior to the vulcanization of said stock a sulfur derivative of a reaction product of an alkyl ketone and alpha-naphthylamine.

9. An age resisting rubber product comprising the vulcanization product of a rubber stock containing prior to the vulcanization of said stock a sulfur derivative of a reaction product of acetone and alpha-naphthylamine.

10. An age resisting rubber product comprising the vulcanization product of a rubber stock containing prior to the vulcanization of said stock the product formed by reacting substantially 18.3 parts of the reaction product of substantially equi-molar portions of acetone and alpha-naphthylamine and substantially 3.2 parts of sulfur.

11. An age resisting rubber product comprising the vulcanization product of a rubber stock containing prior to the vulcanization of said stock a sulfur derivative of a reaction product of a ketone containing a methyl group and alpha-naphthylamine.

In testimony whereof I hereunto affix my signature.

WINFIELD SCOTT.